(12) United States Patent
Jana et al.

(10) Patent No.: US 10,560,244 B2
(45) Date of Patent: Feb. 11, 2020

(54) SYSTEM AND METHOD FOR REDUCING INTER-CELLSITE INTERFERENCE IN FULL-DUPLEX COMMUNICATIONS

(71) Applicant: AT&T Intellectual Property I, L.P., Atlanta, GA (US)

(72) Inventors: Rittwik Jana, Parsippany, NJ (US); Vaneet Aggarwal, Parsippany, NJ (US); Lusheng Ji, Randolph, NJ (US); Rajesh Krishna Panta, Bridgewater, NJ (US); Kadangode K. Ramakrishnan, Berkeley Heights, NJ (US); Christopher W. Rice, Parsippany, NJ (US); Nemmara K. Shankaranarayanan, Bridgewater, NJ (US); Vinay Anant Vaishampayan, Summit, NJ (US)

(73) Assignee: AT&T INTELLECTUAL PROPERTY I, L.P., Atlanta, GA (US)

(*) Notice: Subject to any disclaimer, the term of this patent is extended or adjusted under 35 U.S.C. 154(b) by 246 days.

(21) Appl. No.: 13/949,704

(22) Filed: Jul. 24, 2013

(65) Prior Publication Data
US 2015/0029906 A1    Jan. 29, 2015

(51) Int. Cl.
*H04L 5/00* (2006.01)
*H04L 5/14* (2006.01)

(52) U.S. Cl.
CPC .............. *H04L 5/0073* (2013.01); *H04L 5/14* (2013.01)

(58) Field of Classification Search
CPC .......... H04L 5/0073; H04L 5/14; H04L 27/32
See application file for complete search history.

(56) References Cited

U.S. PATENT DOCUMENTS

| 2002/0085623 | A1* | 7/2002 | Madkour et al. ............. 375/148 |
| 2002/0159422 | A1* | 10/2002 | Li et al. ........................ 370/342 |
| 2002/0177447 | A1* | 11/2002 | Walton ................. H04B 7/0417 455/452.1 |
| 2003/0002490 | A1* | 1/2003 | Wong ................... H04B 1/7103 370/355 |

(Continued)

OTHER PUBLICATIONS

M. Duarte, A. Sabharwal, "Full-Duplex Wireless Communications Using Off-The-Shelf Radios: Feasibility and First Results", Forty-Fourth Asilomar Conference on Signals, Systems, and Computers, 2010.

(Continued)

*Primary Examiner* — Jael M Ulysse

(57) ABSTRACT

Disclosed herein are systems, methods, and computer-readable storage devices for reducing inter-cellsite interference during full-duplex communication. A system receives a channel amplitude and a phase estimate between a first station and a second station, the first station and the second station creating inter-cellsite interference on a channel during full-duplex communications. The system calculates a level of the inter-cellsite interference between the first station and the second station based on the channel amplitude and the phase estimate and generates a cancellation signal based on the inter-cellsite interference. The system then communicates the cancellation signal to the first station for transmission with additional data during additional full-duplex communications.

15 Claims, 12 Drawing Sheets

(56) References Cited

U.S. PATENT DOCUMENTS

| | | | |
|---|---|---|---|
| 2004/0192395 A1* | 9/2004 | Karabinis | H04B 7/0837 455/562.1 |
| 2004/0235510 A1* | 11/2004 | Elicegui | H04W 52/40 455/522 |
| 2005/0099967 A1* | 5/2005 | Baba | H04B 3/23 370/286 |
| 2005/0276314 A1* | 12/2005 | Dateki | H04B 1/7107 375/148 |
| 2007/0054619 A1* | 3/2007 | Kinnunen et al. | 455/63.1 |
| 2007/0230423 A1* | 10/2007 | Yoshida | H04W 76/10 370/338 |
| 2008/0008126 A1* | 1/2008 | Shirakabe | H04B 7/2615 370/329 |
| 2008/0009256 A1* | 1/2008 | Anderson | H04W 72/085 455/296 |
| 2008/0090575 A1* | 4/2008 | Barak et al. | 455/444 |
| 2008/0119215 A1* | 5/2008 | Ji | H04W 52/247 455/522 |
| 2008/0165874 A1* | 7/2008 | Steele | H04L 1/0026 375/261 |
| 2008/0233967 A1* | 9/2008 | Montojo | H04W 72/082 455/452.2 |
| 2008/0267142 A1* | 10/2008 | Mushkin | H01Q 1/2291 370/338 |
| 2008/0298227 A1* | 12/2008 | Jonsson | H04L 5/023 370/210 |
| 2009/0196162 A1* | 8/2009 | Sambhwani | H04B 1/7103 370/201 |
| 2009/0197590 A1* | 8/2009 | Borran | H04W 52/242 455/423 |
| 2009/0233594 A1* | 9/2009 | Duschesne | H04W 52/247 455/423 |
| 2009/0245197 A1* | 10/2009 | Ma | H04L 5/0046 370/330 |
| 2009/0279519 A1* | 11/2009 | Brisebois et al. | 370/338 |
| 2010/0022263 A1* | 1/2010 | Stamoulis | H04W 24/02 455/501 |
| 2010/0041411 A1* | 2/2010 | Mallik | H04W 88/08 455/450 |
| 2010/0080323 A1* | 4/2010 | Mueck | H04J 11/0033 375/296 |
| 2010/0226290 A1 | 9/2010 | Kwak et al. | |
| 2010/0273492 A1* | 10/2010 | Liu | H04B 7/022 455/446 |
| 2010/0323625 A1* | 12/2010 | Kishigami | H04B 7/0434 455/65 |
| 2011/0039496 A1* | 2/2011 | Chueh | H04J 11/0036 455/63.1 |
| 2011/0051797 A1* | 3/2011 | Won | H04B 1/7103 375/232 |
| 2011/0090885 A1* | 4/2011 | Safavi | H04W 52/244 370/338 |
| 2011/0170424 A1* | 7/2011 | Safavi | H04L 43/0811 370/242 |
| 2011/0222416 A1* | 9/2011 | Damnjanovic | H04W 72/12 370/252 |
| 2011/0293028 A1* | 12/2011 | Panicker | H04J 11/0036 375/260 |
| 2011/0319088 A1* | 12/2011 | Zhou | H04W 52/243 455/442 |
| 2012/0020422 A1* | 1/2012 | Dotzler | H04L 5/0073 375/260 |
| 2012/0033571 A1* | 2/2012 | Shimezawa | H04B 7/026 370/252 |
| 2012/0063369 A1* | 3/2012 | Lin | H04B 7/15542 370/279 |
| 2012/0093093 A1* | 4/2012 | Frenger | H04B 7/0452 370/329 |
| 2012/0127949 A1* | 5/2012 | Yoshimoto | H04J 11/0053 370/329 |
| 2012/0201173 A1* | 8/2012 | Jain | H04B 1/525 370/277 |
| 2012/0213092 A1* | 8/2012 | Sun | H04W 52/244 370/248 |
| 2012/0252392 A1* | 10/2012 | Wilkerson et al. | 455/278.1 |
| 2012/0275327 A1* | 11/2012 | Zangi | H04L 1/0001 370/252 |
| 2012/0322492 A1* | 12/2012 | Koo | H04B 7/0417 455/517 |
| 2013/0033998 A1* | 2/2013 | Seo | H04W 24/00 370/252 |
| 2013/0058288 A1* | 3/2013 | Nentwig | H04J 11/0023 370/329 |
| 2013/0077514 A1* | 3/2013 | Dinan | H04L 5/0057 370/252 |
| 2013/0143577 A1* | 6/2013 | Chiu | H04W 36/18 455/442 |
| 2013/0155999 A1* | 6/2013 | Seo | H04L 5/001 370/329 |
| 2013/0156021 A1* | 6/2013 | Ashikhmin | H04L 25/03343 370/338 |
| 2013/0194984 A1* | 8/2013 | Cheng | H04W 72/082 370/294 |
| 2013/0201857 A1* | 8/2013 | Bhargava | H04K 3/222 370/252 |
| 2013/0223294 A1* | 8/2013 | Karjalainen | H04L 5/14 370/277 |
| 2013/0260807 A1* | 10/2013 | Suresh | H04W 24/02 455/501 |
| 2013/0286903 A1* | 10/2013 | Khojastepour | H04L 5/14 370/280 |
| 2013/0301487 A1* | 11/2013 | Khandani | H04W 16/14 370/278 |
| 2013/0301688 A1* | 11/2013 | Khandani | H04W 16/14 375/211 |
| 2014/0098681 A1* | 4/2014 | Stager | H04W 24/02 370/252 |
| 2014/0126437 A1* | 5/2014 | Patil | H04B 7/0486 370/310 |
| 2014/0219162 A1* | 8/2014 | Eyuboglu | H04W 16/26 370/315 |
| 2014/0226506 A1* | 8/2014 | Sadek | H04J 3/1694 370/252 |
| 2014/0269374 A1* | 9/2014 | Abdelmonem | H04L 5/0026 370/252 |

OTHER PUBLICATIONS

OBSAI Specification, Open Base Station Architecture Initiative, BTS System Reference Document Version 2.0, 151 pages—2006.

CPRI Specification V4.2 (Sep. 29, 2010) Interface Specification, Common Public Radio Interface (CPRI): Interface Specification 113 pages.

* cited by examiner

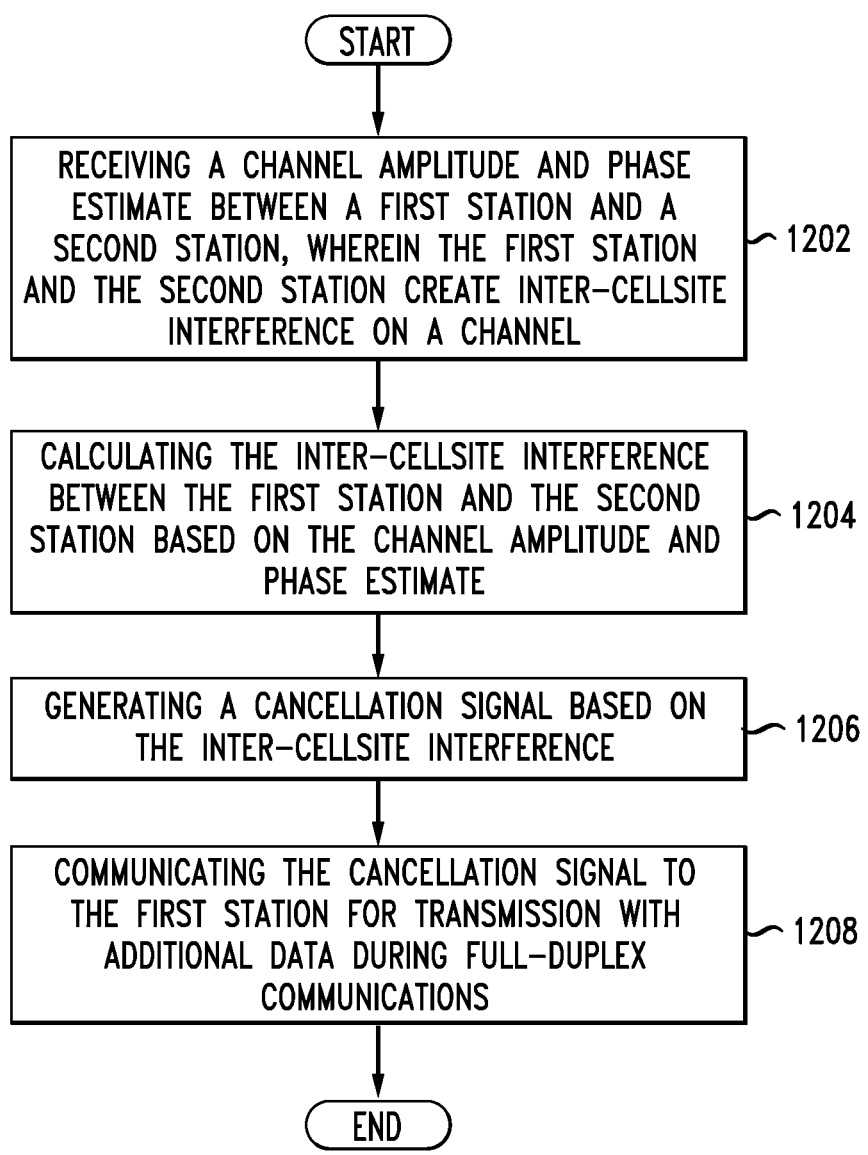

SYSTEM AND METHOD FOR REDUCING INTER-CELLSITE INTERFERENCE IN FULL-DUPLEX COMMUNICATIONS

BACKGROUND

1. Technical Field

The present disclosure relates to full-duplex communication and more specifically to reducing inter-cellsite interference during full-duplex communication.

2. Introduction

Full-duplex communication is defined as simultaneous bi-directional data-links in a given frequency channel. Full-duplex communications has the potential to double the capacity through the removal of a separate frequency band/time slot for both forward and reverse communication links. Full-duplex communication can enable radios, cellular devices, and other wireless devices to communicate more efficiently, increasing throughput and bandwidth between devices. In contrast to Full-duplex communication, half-duplex communication only allows for a single direction data-link per frequency channel at any given time. The ability to both send and receive communications simultaneously in a single channel using full-duplex could, under ideal circumstances, double available bandwidth.

However, when full-duplex communication is occurring, inter-cellsite interference can greatly reduce available bandwidth and throughput. Inter-cellsite interference can occur when three or more full-duplex nodes are each communicating within range of one another in a single channel. As two of the full-duplex nodes communicate, the third node unintentionally receives signals meant for another node. The multiple received signals in a single channel can prevent the third node from correctly receiving and interpreting communications intended for the third node.

Various forms of inter-cellsite interference can exist, such when access points receive communications in a single channel from multiple wireless devices or when user equipment such as a cell phone receives communications from multiple access points. One version of inter-cellsite interference is illustrated in FIG. 2. FIG. 2 shows a communication network 200 with multiple communication towers 202, 204 communicating with wireless devices 216, 218 via full-duplex communication. Each communication tower 202, 204 has associated systems 202A, 202B, such as signal up-converters, down-converters, and amplifiers. In addition, each communication tower 202, 204 has a respective range. For example, tower A 202 has a range 206, and tower B 204 has a range 208.

Each tower 202, 204 receives and transmits signals to: (1) a larger regional/national/international communication network, partially illustrated by connecting cables 214 and a control computer 212, which can in turn connect to additional communication equipment and the larger network; and (2) cellular devices within respective tower ranges 206, 208. In FIG. 2, wireless device 218 is only in range of tower B 204, and communicates in full-duplex with tower B 204, receiving a signal $B_{TX}$ 222 while simultaneously transmitting $B_{RX}$ 224.

Because the communications are full-duplex, both $B_{TX}$ and $B_{RX}$ are respectively transmitted in a single frequency channel in the same time slot/instant. At the same time a second wireless device 216 is within range of both tower A 202 and tower B 204. The second wireless device 216 receives communications $A_{TX}$ 226 from tower A 206, as well as communications $B_{TX}$ 222 targeted for the other wireless device 218 in the same frequency channel from tower B, resulting in inter-cellsite interference at the second device 216.

BRIEF DESCRIPTION OF THE DRAWINGS

FIG. 12 illustrates an example method embodiment.

DETAILED DESCRIPTION

Figure 1:
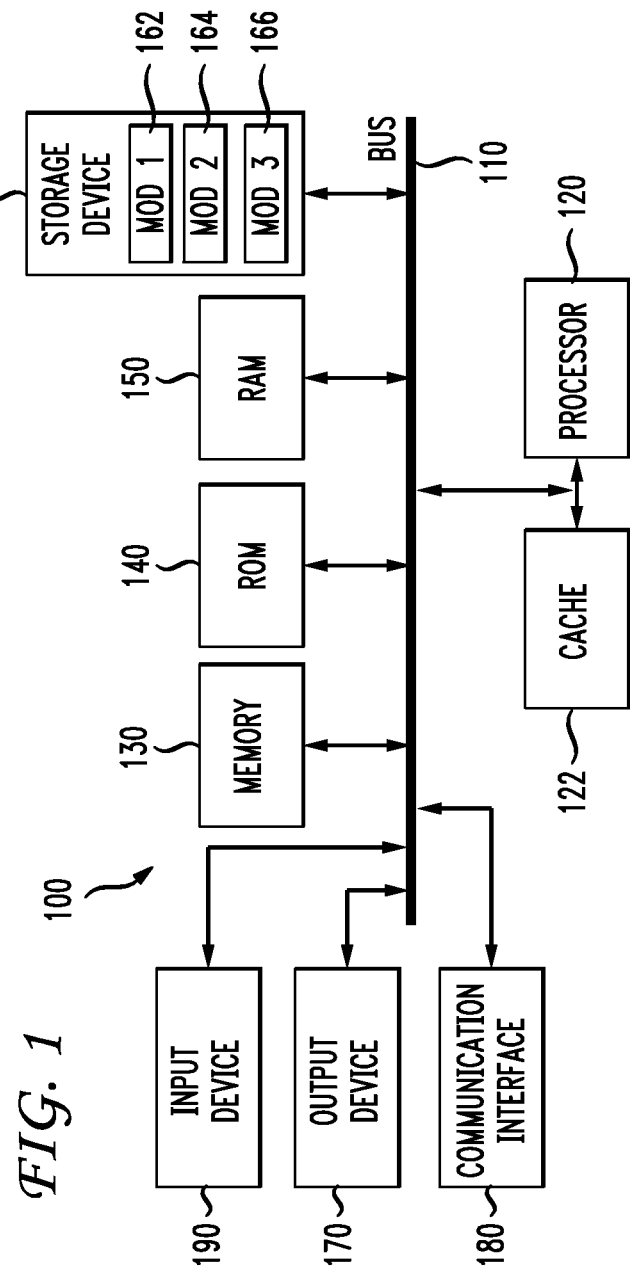
FIG. 1 illustrates an example system embodiment.

A system, method and computer-readable media are disclosed which reduce inter-cellsite interference during full-duplex communications. A system configured according to this disclosure receives a channel amplitude and phase estimate associated with a signal transmitted from a first node and received at second node, where the signal creates inter-cellsite interference on a channel at the second node. A level, or degree, of inter-cellsite interference calculated by the system can depend on additional factors, such as a distance between nodes, known geography/objects between the first and second nodes (such as buildings or mountains), and atmospheric attenuation. The system can receive the channel amplitude and phase estimate via wireless communications, copper cabling, fiber optics, or other network connections from the first node. The channel associated with the signal can be a specific range of the electromagnetic spectrum being used for full-duplex communications.

Using the channel amplitude and phase estimate of the signal, the system calculates, via a processor, the inter-cellsite interference which will be occurring at the second node. Based on the calculated level of inter-cellsite interference, the system generates a cancellation signal which, when added to the inter-cellsite interference at the second node, cancels or attenuates the inter-cellsite interference to the point where the second node can recover and/or interpret desired signals in the same channel as the inter-cellsite interference. Having created the cancellation signal, the system communicates the cancellation signal to the second node where it can be combined with the interfering signal, thereby reducing the inter-cellsite interference.

To implement the cancellation signal at the second node which is experiencing inter-cellsite interference, the system can use various approaches based on the type of node experiencing the interference. For example, if the node is an access point with a wired (i.e., fiber optic, copper, or other cabling) connection to the system which generated the cancellation signal, the system can transmit the cancellation signal through the wiring. If the node experiencing the inter-cellsite interference is a wireless node, the system can communicate the cancellation signal to an access point communicating with the interfered node. The access point forwards the cancellation signal to the interfered node.

Where the cancellation signal is communicated wirelessly, the cancellation signal can be transmitted to the second node using the same channel having the inter-cellsite interference. In other configurations, the cancellation signal can be transmitted using an alternative channel than the channel having the inter-cellsite interference, in which case the second node processes the signal appropriately to generate the cancellation signal. These and other various embodiments of the disclosure are described in detail below. While specific implementations are described, it should be understood that this is done for illustration purposes only. Other components and configurations may be used without parting from the spirit and scope of the disclosure.

A brief introductory description of a basic general purpose system or computing device in FIG. 1 which can be employed to practice the concepts, methods, and techniques disclosed is illustrated. A more detailed description of reducing inter-cellsite interference during full-duplex communications will then follow using a variety of embodiments. These variations shall be described herein as the various embodiments are set forth. The disclosure now turns to FIG. 1.

With reference to FIG. 1, an exemplary system and/or computing device 100 includes a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the computer-readable storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the processor. The processor 120 may be a self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. The system 100 can include other hardware or software modules. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out a particular function. In another aspect, the system can use a processor and computer-readable storage medium to store instructions which, when executed by the processor, cause the processor to perform a method or other specific actions. The basic components and appropriate variations can be modified depending on the type of device, such as whether the device 100 is a small, handheld computing device, a desktop computer, or a computer server.

Although the exemplary embodiment(s) described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media expressly exclude media such as energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic hardware depicted may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 3:
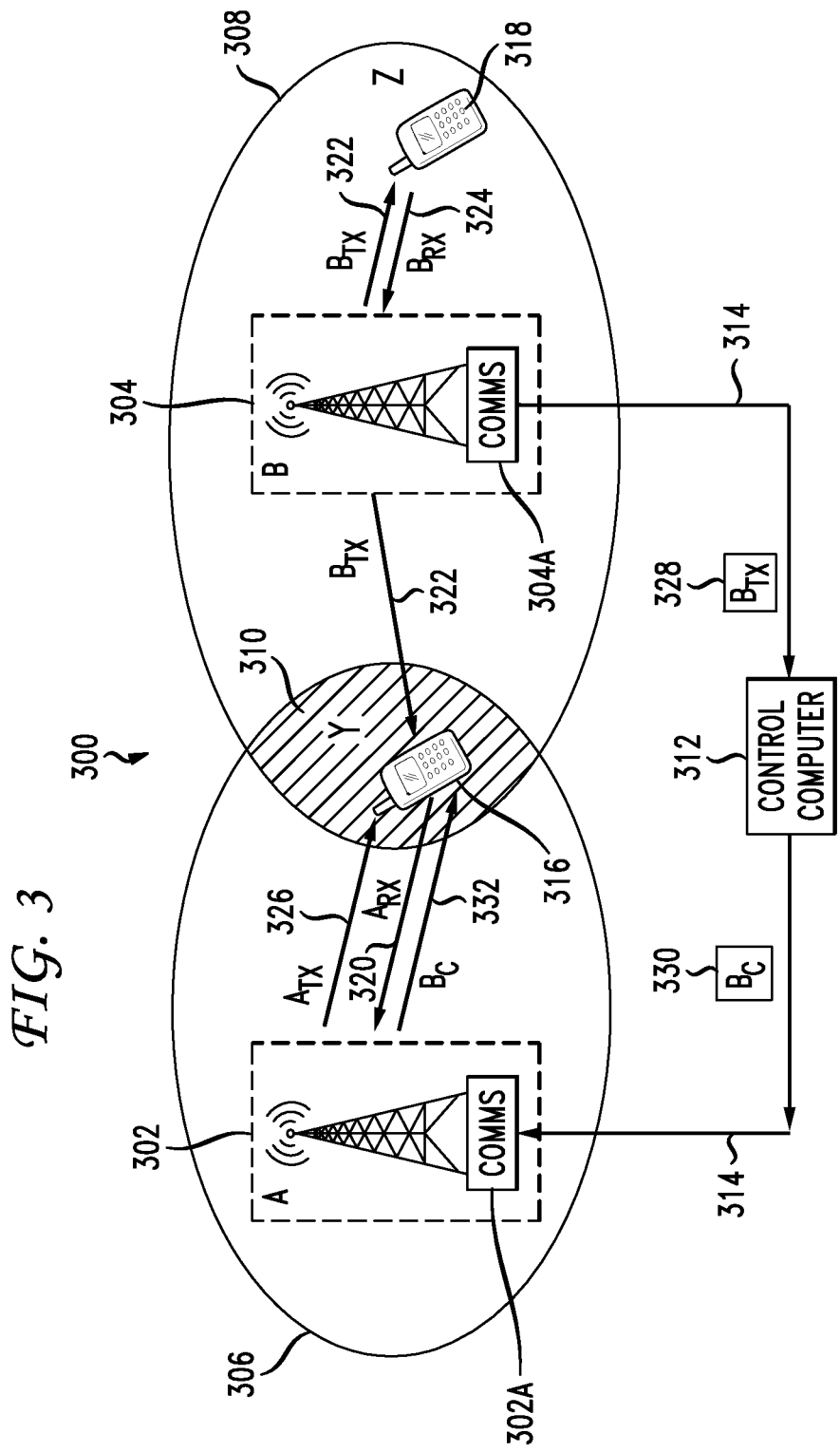
FIG. 3 illustrates a first embodiment reducing inter-cellsite interference at a wireless node.

Having disclosed some components of a computing system, the disclosure now turns to FIG. 3, which illustrates a first embodiment 300 for reducing inter-cellsite interference at a wireless node. While the embodiment 300 is directed to reduction of inter-cellsite interference for a wireless node, the principles can be applied to other node configurations experiencing inter-cellsite interference, such as access points or other wired nodes.

Figure 2:
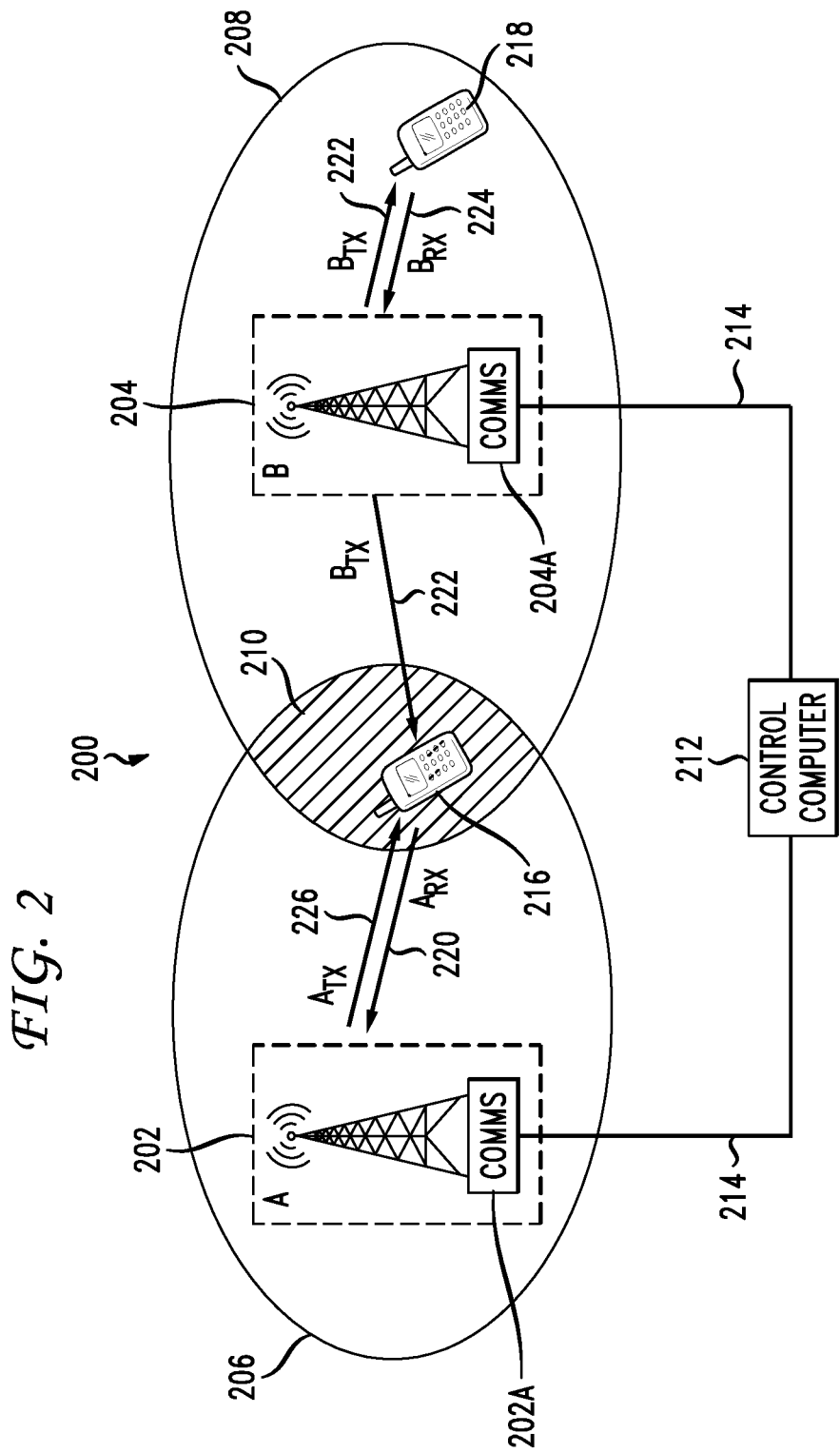
FIG. 2 illustrates inter-cellsite interference at a wireless device.

A control computer 312 receives signals from regional, national, or international communication networks which are directed to wireless nodes Y 316 and Z 318. Just as in FIG. 2, the access points 302, 304, or cellular towers, are used to communicate the signals from the control computer 312 to the wireless nodes 316, 318 using communications equipment 302A, 304B such as upconverters, downconverters, and amplifiers. The access points 302, 304 have ranges 306, 308 illustrated as ellipses. While the ranges 306, 308 are illustrated as ellipses, the range of any wireless access point can vary based on antenna type used at the access point (such as omni directional, parabolic, dipole, helical, aperture, etc.), natural obstacles near the access point (such as mountains, buildings, or walls/impediments within a building), and beamforming. If the access points 302, 304 were wireless routers instead of cellular towers, the nodes Y 316, Z 318 could be any wireless device in addition to cellular phones. For example, nodes Y 316 and Z 318 can be any devices which are compliant with 802.11 specifications, such as laptops, tablets, or smartphones communicating via 802.11 protocols.

A central computer 312 schedules communications from each access point in the network to the wireless devices within the central computer's control. The schedule can be based on the locations of wireless nodes in relation to access points at a given moment, where and if the nodes are moving (i.e., movement vectors), or other network factors such as network load, capacity, and tower capability. Based on the schedule, tower A 302 communicates via full-duplex with cellular node Y 316, transmitting data $A_{TX}$ 326 while receiving data $A_{RX}$ 320. Likewise, tower B 304 communicates with cellular node Z 318 in full-duplex, transmitting data $B_{TX}$ 322 while receiving data $B_{RX}$ 324. Node Y 316 communicating with tower A 302 is physically located in a shared range 310 corresponding to both the range 306 of tower A 302 and the range 308 of tower B 304, and therefore receives not only data $A_{TX}$ 326 from tower A 302, but also receives data $B_{TX}$ 322 targeted for node Z 318. Receiving both data $A_{TX}$ 326 and data $B_{TX}$ 322 results in inter-cellsite interference at node Y 316.

The central computer 312, having scheduled tower A 302 and tower B 304 to transmit the signals, determines that inter-cellsite interference is likely to occur at node Y 316 to yield a determination or a result of an analysis. The determination can be further aided by information relayed to the central computer regarding the geographic location of node Y 316, or by node Y transmitting a signal to the central computer indicating inter-cellsite interference is occurring.

To reduce the inter-cellsite interference, tower B 304 communicates $B_{TX}$ 328 via a hardline 314, such as a fiber-optic cable or a copper communication cable, to the central computer 312. When the control computer 312 receives the signal $B_{TX}$ 328 via the fiber optic cable 314 from tower B 304, the control computer 312 generates a baseband cancellation signal $B_C$ 330 which is communicated to tower A 302. Tower A 302 converts the baseband cancellation signal $B_C$ 330 into a radio frequency signal $B_C$ 332, which is transmitted to node Y 316. Alternatively, the baseband cancellation signal $B_C$ 330 could be forwarded to node Y 316, with Y 316 producing the RF cancellation signal locally. Having received the cancellation signal $B_C$ 330, node Y combines $B_C$ 330 with the combination of $A_{TX}$ 326 and $B_{TX}$ 322. By combining the cancellation signals, node Y 316 attenuates or at least partially cancels the interfering signal $B_{TX}$ 322, enabling node Y 316 to successfully receive and/or interpret $A_{TX}$ 326 The cancellation signal $B_C$ 332 can be transmitted by tower A 302 using the same frequency channel as the full-duplex communications $A_{TX}$ 326, $A_{RX}$ 320, or can be transmitted on a distinct frequency channel. Depending on the type of communication, i.e., frequency, time, code, or any combination of modulation parameters used to distinguish signals, any of the signals discussed herein, such as the cancellation signal, can be communicated using the proper modulation parameter according to the modulation parameter of the signal that needs to be cancelled.

Figure 4:
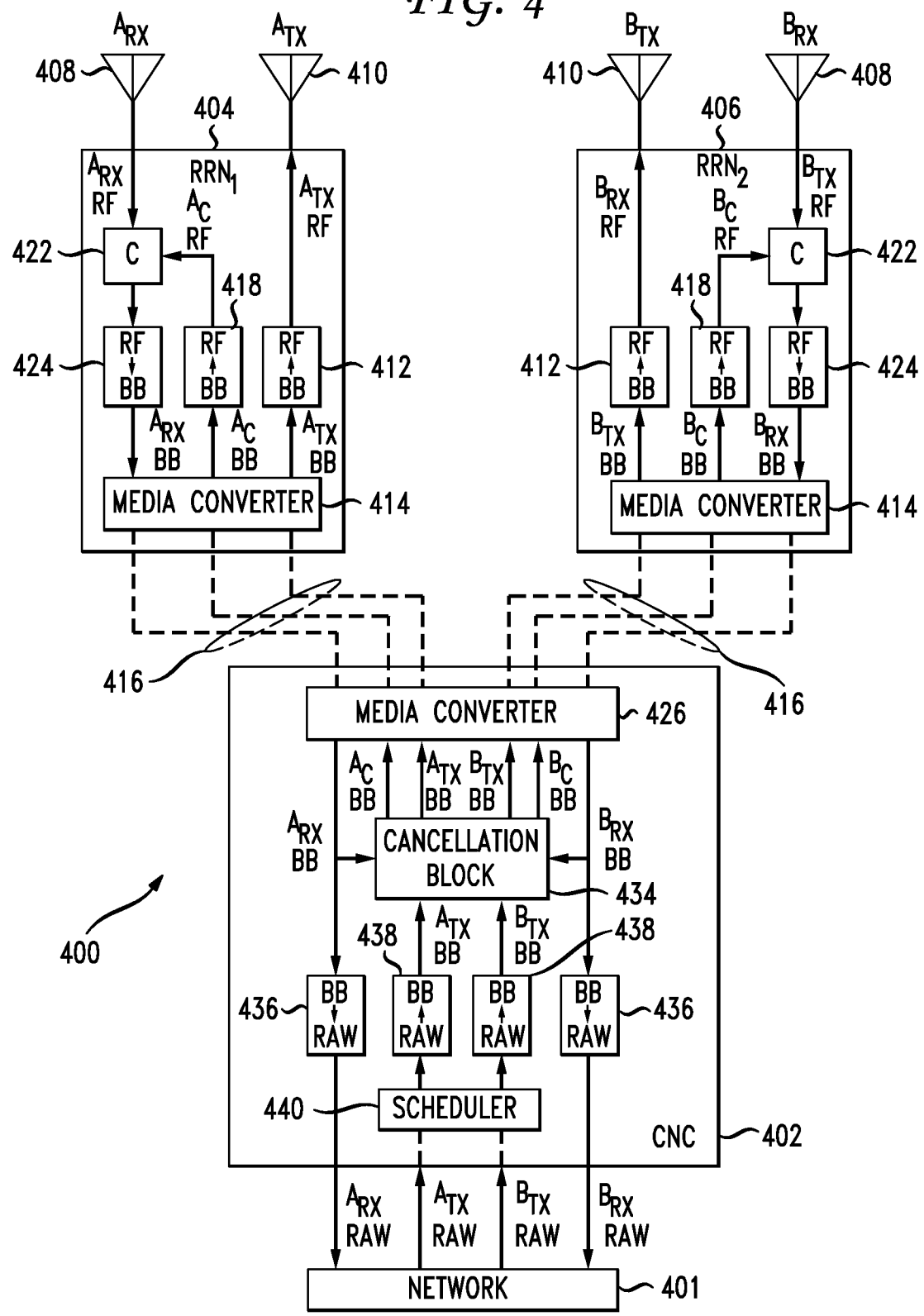
FIG. 4 illustrates a first hardware configuration.

FIG. 4 illustrates a first hardware configuration 400 which can be used to attenuate inter-cellsite interference. Configuration 400 represents two access point nodes (Remote Radio Node 1, known as $RRN_1$ 404, and Remote Radio Node 2, known as $RRN_2$ 406) which are receiving inter-cellsite interference from one another when communicating wirelessly with other nodes. While only two remotes nodes are illustrated, other configurations could have additional remote nodes. Each remote node 404, 406 is connected by fiber optic cables 416 to a Central Processing Node (Control Computer, Central Computer, or Central Node Computer CNC) 402. Each remote node 404, 406 represents an access point, such as a cellular tower, a wireless router, or a repeater. In one aspect they could represent mobile devices as well.

Each remote node 404, 406 has at least two antennae: a first antenna 410 for transmitting signals and data to wireless nodes in range of the remote node, and a second antenna 408 for receiving signals and data from wireless nodes in range. Having multiple antennae allows for the remotes nodes 404, 406 to calculate, detect or predict self-interference, which in turn allows generation of cancellation/attenuation of the self-interference. The cancellation signals used to cancel self-interference can be produced by the cancellation block 434 at the central computer 402. The self-interference cancellation signals are transmitted with or in parallel to inter-cellsite cancellation signals, also produced by the cancellation block 434. Alternatively, each remote node 404, 406 can generate a respective self-interference cancellation signal at the remote node.

The central computer 402 of the system 400 receives $A_{TX}$ and $B_{TX}$ from a larger network 401 which can represent any network. For example, if an individual in New York City were speaking with someone in San Francisco, the voice signals are carried most of the distance across a national network by fiber optic or copper cabling. As received, $A_{TX}$ and $B_{TX}$ are in a 'raw' format, meaning the signals are packetized for long-distance communications. For example, the raw format can include CPRI (Common Public Radio Interface) standard formats. As another example, the raw format can include other forms of signal modulation, such as inphase and quadrature phase amplitude modulations (I and Q phase sampling). As yet another example, the 'raw' data can be in the form of a binary stream of data, which can be communicated in a single channel or multiple channels based on specific communication capabilities. Likewise, signals transmitted partially by satellite or other formats can be delivered to the central computer 402 in a raw format. Upon receiving the raw signals for a given region associated with the central computer 402, a scheduler 440 determines which access points will transmit the baseband signals to corresponding wireless devices. The baseband signals are digitally modulated signals (I+Q). The scheduler 440 can also determine other transmission settings, such as the wireless channel to be used, a timing, additional modulation schemes, any necessary encryptions or code division, and if necessary, an order for the transmission to be sent in.

The central computer 402 receives raw transmit signals $A_{TX}$ and $B_{TX}$ from a larger network 401 which can represent any network. The central computer 402 converts 438 the raw signals into baseband signals ($A_{TX\ BB}$ and $B_{TX\ BB}$) and a scheduler 440 determines which remote nodes $RRN_1$ 404 and $RRN_2$ 406 are ideal to transmit the signals $A_{TX}$ and $B_{TX}$ to the destination nodes. However, the central computer 402 also recognizes that because of the scheduling, the remote nodes 404, 406 will have inter-cellsite interference.

To counteract the inter-cellsite interference, the central computer 402 inputs the baseband transmit signals ($A_{TX\ BB}$ and $B_{TX\ BB}$) into a cancellation block 434. The cancellation block outputs the transmit signals ($A_{TX\ BB}$ and $B_{TX\ BB}$) without modification. In other configurations, only a copy or a portion of the baseband transmits signals are forwarded to the cancellation block 434, with a remainder of the signal bypassing the cancellation block. The cancellation block 434 also outputs a cancellation signal ($A_{C\ BB}$ and $B_{C\ BB}$) customized for the interference being experienced at each remote node.

The customized cancellation signals generated are based on phase, amplitude, modulation, and/or other details associated with the interference being experience at the remote nodes. The measurements and details of the interference can be calculated entirely at the central computer 402, or can be based on feedback from received signals ($A_{RX}$ and $B_{RX}$) input into the cancellation block. As an example, the cancellation block 434 can use the transmit signals ($A_{TX}$ and $B_{TX}$) combined with feedback received from the remote nodes ($A_{RX}$ and $B_{RX}$) to generate the cancellation signals $A_C$ and $B_C$. The cancellation signals can have an opposite phase and amplitude of the interfering signal, which, when combined with the interfering signal, attenuates and/or cancels the interference. These cancellation signals are output from the cancellation block 434 in a baseband format ($A_{C\ BB}$ and $B_{C\ BB}$) before being forwarded to a media converter 426 which communicates both the transmit signals and the cancellation signals to the appropriate remote nodes 404, 406. Other forms and formats of communication can be used for between remote radio nodes and the central computer, such as wireless communications.

The remote nodes use media converters 414 to decode the transmission and cancellation signals, then upconvert the baseband signals to a radio frequency channel. For example, considering only RRN1 404, the cancellation signal $A_C$ is upconverted 418 from baseband $A_{C\ BB}$ to a radio frequency channel $A_C$ RF. Similarly, the transmit signal $A_{TX}$ is upconverted 412 from baseband $A_{TX\ BB}$ to a radio frequency channel $A_{TX}$ RF. The channel to which the signal is upconverted can be determined as part of the schedule configured by the scheduler 440, and is used in full-duplex communications. Having converted the transmit signal ATX to a radio frequency channel, the transmit signal is transmitted from a transmit antenna 410 on the full-duplex channel.

The receive antenna 408 receives: (1) the radio frequency signal $A_{TX}$ being transmitted from the transmit antenna 410, which results in self-interference; (2) any radio frequency signals $A_{RX}$ directed to the remote node; and (3) any additional radio frequency signals in the frequency channel which can be targeted for other remote nodes (such as $B_{TX}$). Because all of these radio frequency signals are communicated in a single frequency channel, both inter-cellsite interference and self-interference can result. For example, the receive antenna 408 of $RRN_1$ 404 will receive $A_{RX}$, $A_{TX}$, and $B_{TX}$. Of the signals received ($A_{RX}$, $A_{TX}$, and $B_{TX}$), only $A_{RX}$ is desired.

Receiving $B_{TX}$ at causes inter-cellsite interference at $RRN_1$ 404. To attenuate the inter-cellsite interference, $RRN_1$ 404 combines 422 the upconverted cancellation signal $A_{C\ RF}$ with the received signals. The combination of $A_C$ and $B_{TX}$ results in the attenuation/cancellation of $B_{TX}$ on $RRN_1$ 404, thereby reducing the inter-cellsite interference.

Receiving $A_{TX}$ results in self-interference at $RRN_1$ 404. Removal of the self-interference relies on a combination of (1) knowing $A_{TX}$ will cause self-interference and (2) determining a level/phase of the self-interference caused. Because $A_{TX}$ is passed through the central computer 402 prior to transmission, the central computer can prepare the self-interference cancellation signal prior to the self-interference occurring. The self-interference cancellation signal, for purposes of illustration, is combined with the inter-cellsite cancellation signal $A_C$. Therefore, upon combining $A_C$ and $A_{TX}$ at point C 422, $A_{TX}$ is cancelled or attenuated until self-interference is sufficiently reduced.

Accurately preparing both the self-interference cancellation signal and the inter-cellsite cancellation signal can require knowledge of the power levels and phases of the interfering signals. The power levels and phases are provided to the cancellation block from the "clean" signal $A_{RX}$ after both $A_{TX}$ and $B_{TX}$ are removed. For example, the clean $A_{RX\ RF}$ signal is downconverted 424 from the radio frequency signal to baseband, communicated to the central computer 402, and input into the cancellation block 434. The feedback regarding power level, phase, and other parameters is used for future cancellation of self-interference and inter-cellsite interference.

In FIG. 4 the self-interference cancellation signal is illustrated as being combined with the inter-cellsite cancellation signal $A_C$. However, in other configurations the self-interference cancellation can be a separate signal. In addition, other configurations can have separate locations for cancelling the self-interference and inter-cellsite interference signals instead of cancelling both forms of interference at a single location. In addition, while the above description focuses on $RRN_1$ 404, the same ideas and processes apply to $RRN_2$ 406, or any additional nodes which can cause or receive interference. The central computer 402, having received clean baseband signals $A_{RX\ BB}$ and $B_{RX\ BB}$ converts the baseband signals to 'raw' digital data, and can then communicate these signals $A_{RX\ RAW}$ and $B_{RX\ RAW}$ to the wider network.

An advantage of the first hardware configuration 400 includes a delay between the estimation and cancellation of inter-cellsite interference because the cancellation block 434 is located at the central computer 402 and not at the remote nodes 404, 406. Additional advantages include simple remote relay nodes 404, 406, with a complex central node 402, and a configuration which enables multiple inputs and multiple outputs (MIMO). Disadvantages include multiple high bit-rate digital modulation signals per remote relay node 404, 406.

Figure 5:
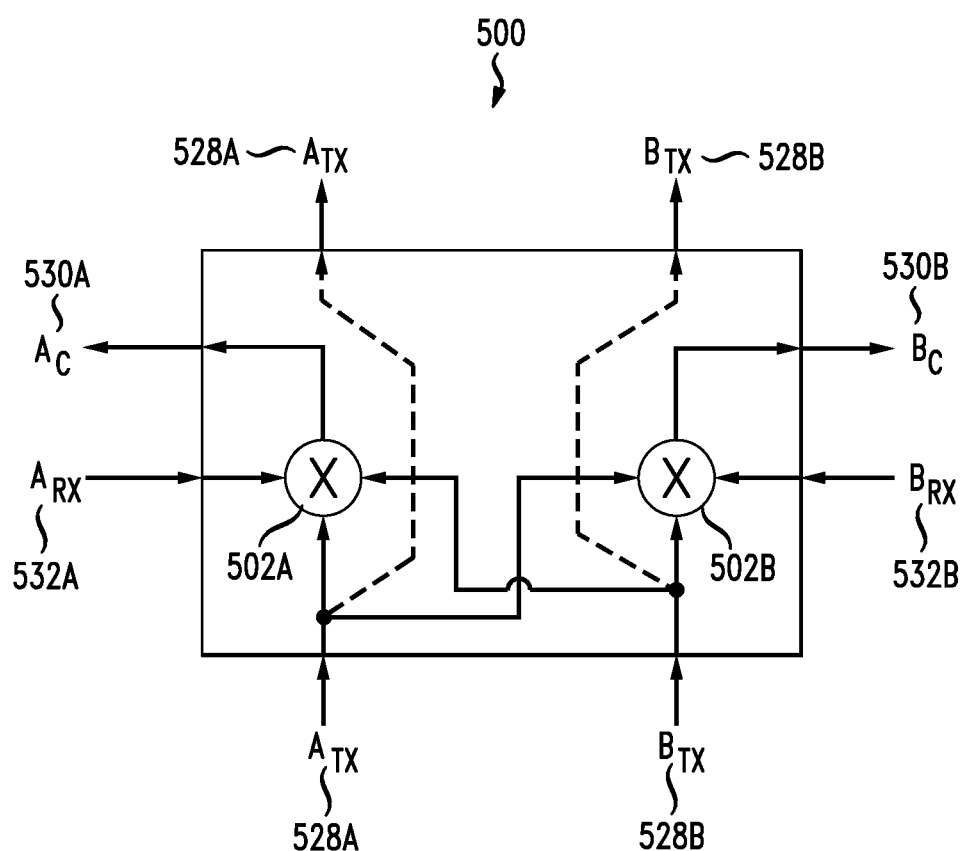
FIG. 5 illustrates a cancellation block.

FIG. 5 illustrates an exemplary cancellation block 500 such as the cancellation block 434 of FIG. 4. All signals illustrated in FIG. 5 are baseband signals, but other signals, such as a radio frequency signals, can utilize the same principles disclosed here. The cancellation block 500 receives as input signals $A_{TX}$ 528 A, $B_{TX}$ 528B, as well as received feedback signals $A_{RX}$ 532 A and $B_{RX}$ 532B. The feedback signals $A_{RX}$, $B_{RX}$ provide information which can be used for self-interference cancellation, such as power level and phase change of the self-interfering signal and/or the inter-cellsite interference.

To create the inter-cellsite cancellation signal of $B_{TX}$, $B_{TX}$ is first communicated to a signal inverter 502A. Signal inverter 502A uses the inter-cellsite cancellation feedback received from $A_{RX}$ to create an inter-cellsite cancellation signal which, when added to $B_{TX}$, sufficiently attenuates $B_{TX}$ to a level where desired signals can be retrieved and interpreted. The inter-cellsite cancellation signal $A_C$ 530 A is then output from the cancellation block. The signal inverter 502A can also use $A_{TX}$ and self-interference feedback from $A_{RX}$ to generate a self-interference cancellation signal. The self-interference cancellation signal can be output in combination or separately from the inter-cellsite cancellation signal $A_C$.

Creating the inter-cellsite cancellation signal of $A_{TX}$ mirrors the described process of cancelling $B_{TX}$. $A_{TX}$ is first communicated to a signal inverter 502B. Signal inverter 502B uses the inter-cellsite cancellation feedback received from $B_{RX}$ to create an inter-cellsite cancellation signal $B_C$ which, when added to $A_{TX}$, sufficiently attenuates $A_{TX}$ to a level where desired signals can be retrieved and interpreted. The inter-cellsite cancellation signal $B_C$ 530B is then output from the cancellation. The signal inverter 502B also uses $B_{TX}$ and the self-interference feedback from $B_{RX}$ to generate a self-interference cancellation signal. The self-interference cancellation signal can be output in combination or separately from the inter-cellsite cancellation signal $B_C$. The cancellation block 500 also outputs $A_{TX}$ 528 A and $B_{TX}$ 528B from the block 500 without modifying or attenuating $A_{TX}$ and $B_{TX}$.

Figure 6:
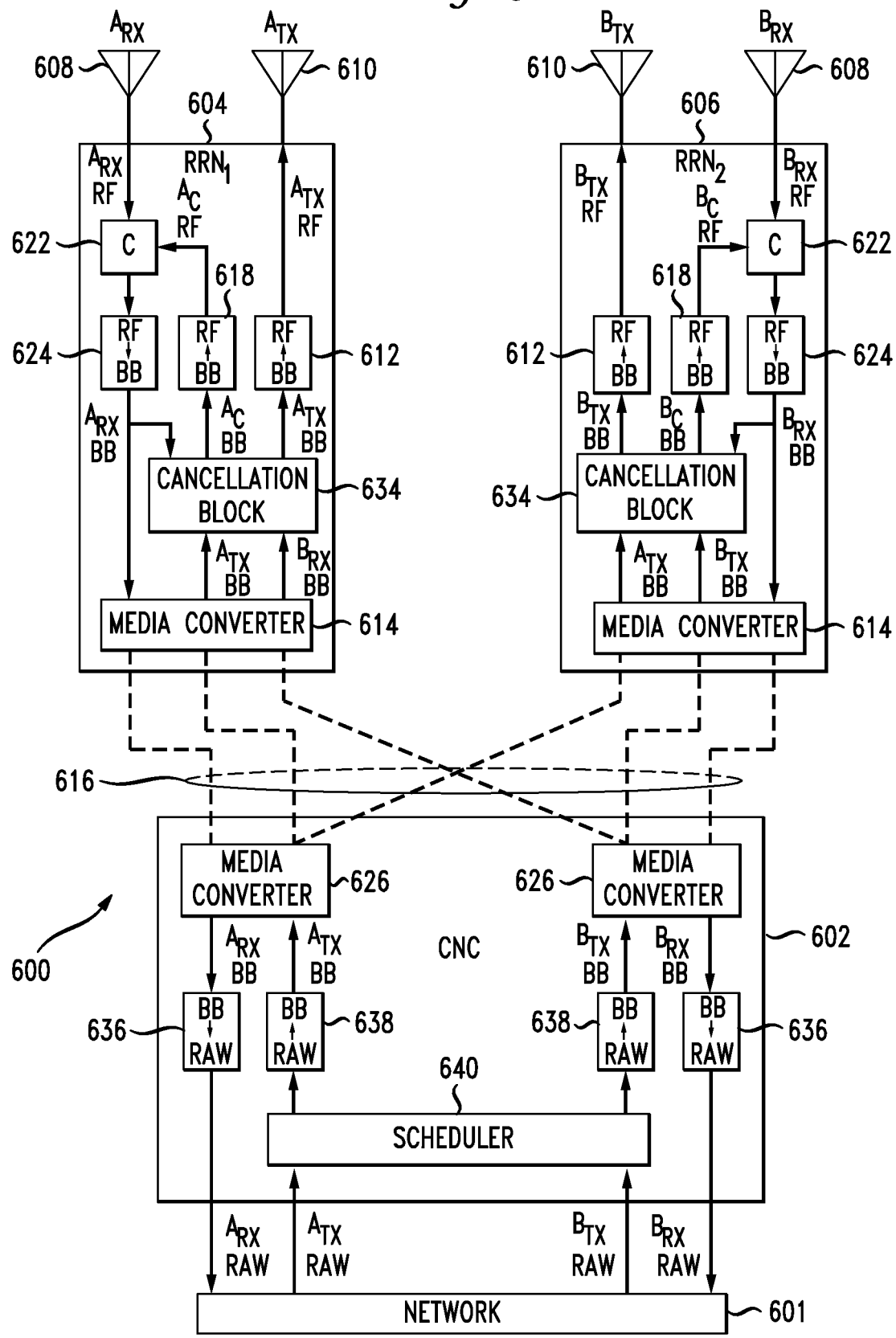
FIG. 6 illustrates a second hardware configuration.

FIG. 6 illustrates a second hardware configuration 600. As illustrated, the cancellation blocks 634 are housed at the remote radio nodes 604, 606 instead of the central computer. The central computer 602 receives raw transmit signals $A_{TX\ RAW}$ and $B_{TX\ RAW}$ from a larger network 601. The scheduler 640 then determines that remote nodes $RRN_1$ 604 and $RRN_2$ 606 are ideal to transmit the signals $A_{TX}$ and $B_{TX}$ and converts the signals to baseband 638. However, the central computer also recognizes that because of the scheduling, the remote nodes 604, 606 will have inter-cellsite interference. Accordingly, in addition to forwarding $A_{TX\ BB}$ and $B_{TX\ BB}$ to their respective nodes for transmission via a media converter 626, the central computer also forwards the signal which will cause the inter-cellsite interference to each remote node.

For example, $RRN_1$ 604 receives $A_{TX\ BB}$ because $RRN_1$ will transmit $A_{TX}$, and $RRN_1$ also receives $B_{TX\ BB}$ because the central computer 402 determines $RRN_1$ will have inter-cellsite interference caused by $B_{TX}$ being received. The central computer 602 uses fiber optic cables 616, or copper cabling, to communicate with the remote nodes 604, 606. Should the nodes be wireless, the same principles apply, but would be modified for lack of a hard-wire connection.

The remote radio nodes 604, 606, upon receiving the signals $A_{TX\ BB}$ and $B_{TX\ BB}$ input both baseband signals into the cancellation block 634. For example, $RRN_1$ 604 will input both $A_{TX\ BB}$ and $B_{TX\ BB}$ into the cancellation block 634. $A_{TX\ BB}$ is input for the purpose of creating a self-interference cancellation signal, and $B_{TX\ BB}$ is input for the purpose of removing inter-cellsite interference. Likewise, $RRN_2$ 606 will input both $A_{TX\ BB}$ and $B_{TX\ BB}$ into the cancellation block 634, with $B_{TX\ BB}$ being input for the purpose of removing self-interference, and $A_{TX\ BB}$ for the purpose of removing inter-cellsite interference.

For $RRN_1$ 604, the baseband transmit signals $A_{TX\ BB}$ is sent around or passed through the cancellation block 634, upconverted 612 from a baseband signal into a radio frequency channel to be used for full-duplex communications, and transmitted using a transmit antenna 610. As in FIG. 4, the receive antenna 608 for $RRN_1$ 604 receives $A_{TX\ RF}$, $B_{TX\ RF}$, and $A_{RX}$ RF, of which only $A_{RX\ RF}$ is desired. Cancellation signal $A_{C\ BB}$ is output from the cancellation block 634, upconverted 618 to $A_{C\ RF}$, and combined with the received signals at C 622. Upon combining $A_{C\ RF}$ with the received signals, $A_{TX\ RF}$, which causes self-interference, is cancelled along with $B_{TX\ RF}$ which causes inter-cellsite interference.

The remaining "clean" $A_{RX\ RF}$ is downconverted from RF to baseband 624, at which point $A_{RX\ BB}$ is input into the cancellation block 634 for feedback in producing the cancellation signals. $A_{RX\ BB}$ is also forwarded to the media converter 614 for transmission back to the central computer 602. The feedback used by the cancellation block 634 can include power levels of the self-interference and inter-cellsite interference, as well as phase and associated signal parameters. The central computer 602, upon receiving $A_{RX\ BB}$, converts 636 $A_{RX\ BB}$ from baseband to a bitstream $A_{RX\ RAW}$, then forwards $A_{RX\ RAW}$ to the larger network. $RRN_2$ 606 performs the same process as $RRN_1$ 604, using $B_{TX\ BB}$ and $A_{TX\ BB}$ to create cancellation signals $B_{C\ BB}$ capable of cancelling or attenuating the self-interference and inter-cellsite interference, eventually sending $B_{RX\ BB}$ back to the central computer 602 and out to the larger network.

Advantages of the second hardware configuration 600 include minimal delay between estimation and cancellation because the cancellation block 634 is located in the respective remote relay nodes 604, 606. Another advantage is a capability of network MIMO (multiple input/multiple output). A disadvantage is that there are several high bit-rate digital modulation signals per remote relay node 604, 606.

In order to achieve the minimal delay in the second hardware configuration 600, several additional downlink signals (for example, 6 to 8) must be sent to each remote relay node 604, 606. If these downlink signals are all digital modulation signals, the bandwidth requirements which are already high may become intractable.

Figure 7:
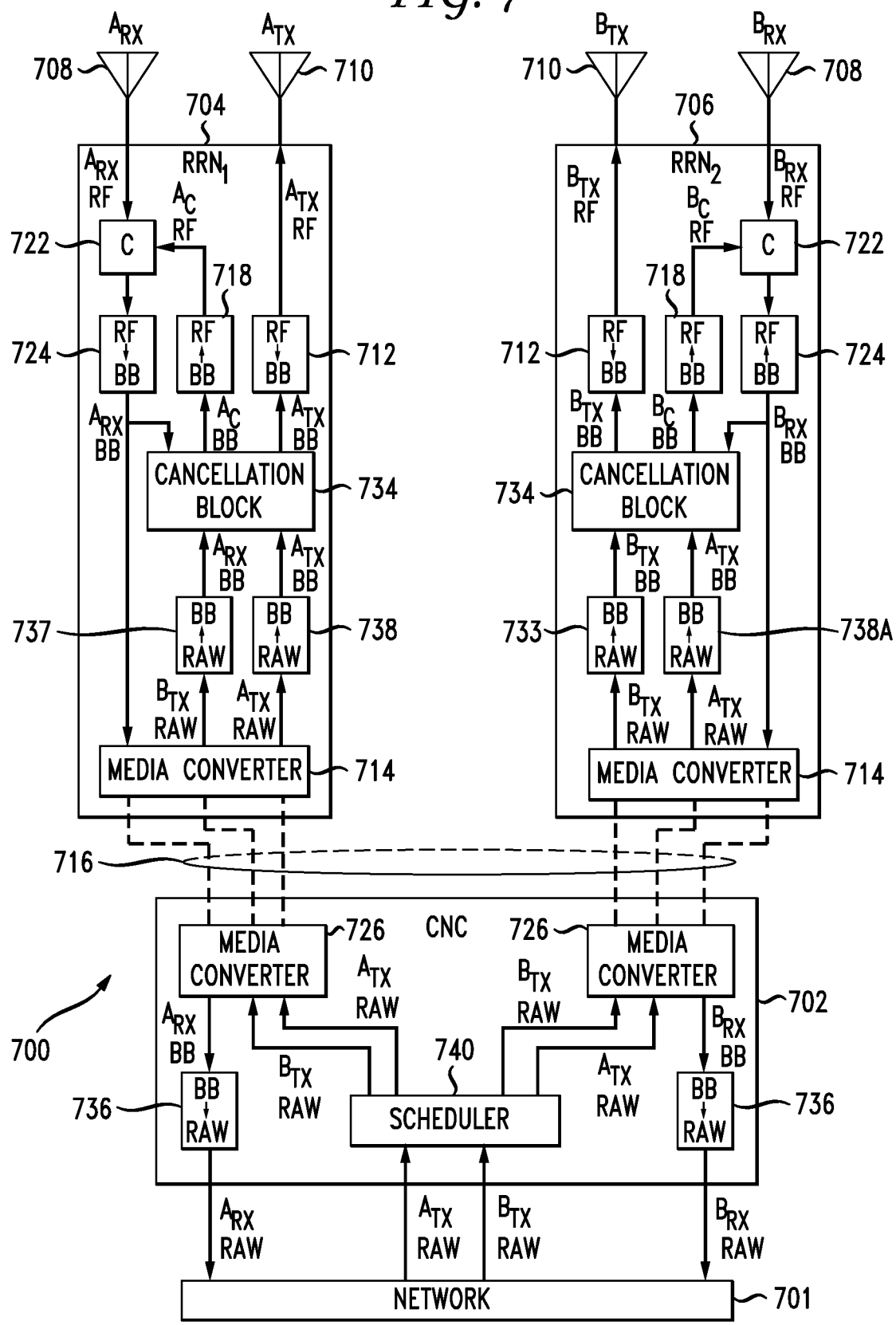
FIG. 7 illustrates a third hardware configuration.

FIG. 7 illustrates a third hardware configuration 700. FIG. 7 is similar to FIG. 6, however, where the configuration of FIG. 6 converts the transmit signals to a baseband signal at the central computer 702, then communicates the transmit signals (i.e., $A_{TX\ BB}$ and $B_{TX\ BB}$) to the remote radio nodes 704, 706 via a media converter 726, 714, the configuration of FIG. 7 converts raw transmit signal data to a baseband signal at the remote radio nodes 704, 706. The conversion from raw bitstream signal data to baseband signals occur at modems 737, 738. In alternative configurations, the 'raw'/ bitstream data can share a common modem or converter, rather than separate modems 737,738. The central computer 702 still receives the raw transmission data from a network 701, schedules 740 the data, and forwards the data via media converters 726, 714, or the raw transmission data can be sent directly to the remote radio nodes 704, 706 from a larger network 701 based on a schedule determined by the central computer scheduler 740.

The remainder of the configuration 700 is similar to that of FIG. 6. After the remote radio nodes 704, 706 convert 737, 738 the raw data $A_{TX\ RAW}$, $B_{TX\ RAW}$ to baseband signals $A_{TX\ BB}$ and $B_{TX\ BB}$, the baseband signals $A_{TX\ BB}$ and $B_{TX\ BB}$ are input into the cancellation block 734 to create cancellation signals. Outputs from the cancellation block 734 include the transmit signal $A_{TX\ BB}$ and the cancellation signal $A_{C\ BB}$. These outputs are then converted from baseband to RF, and the transmission signal $A_{TX\ RF}$ is transmitted by the transmit antenna 710. The cancellation signal $A_{C\ RF}$ is combined with the received signals at point C 722 with the signals received by the receive antenna 708, cancelling or reducing inter-cellsite interference and self-interference. The resulting "clean" signal $A_{RX\ RF}$ is downconverted 724 from RF to a baseband signal. $A_{RX\ BB}$ is then input to the cancellation block to provide feedback regarding the inter-cellsite interference and self-interference. $A_{RX\ BB}$ is also communicated, via a media converter 714 and cabling 716, to the central computer 702. The baseband $A_{RX\ BB}$ is converted to a raw data bitstream $A_{RX\ RAW}$, and forwarded to a larger network 701. RRN$_2$ 706 follows a similar path using $A_{TX\ BB}$ and $B_{TX\ BB}$ to generate cancellation signals, then eventually providing $B_{RX\ RAW}$ to the larger network.

Advantages of the third hardware configuration 700 include minimal delay between inter-cellsite estimation and cancellation due to the cancellation block 734 being located in the remote relay nodes 704, 706. Additional advantages include a lower frame rate used when multiple downlink signals exist for each remote relay node and a capacity for network MIMO. Also, several additional downlink signals are sent in information payload form (PHY/MAC frames) resulting in large savings, while retaining digital modulation for the uplink path. This enables network MIMO techniques since the received signals need to be processed at a common point such as the CNC 702. A disadvantage of the configuration 700 includes having multiple baseband converters 738A, 738B in each remote relay node 704, 706.

Figure 8:
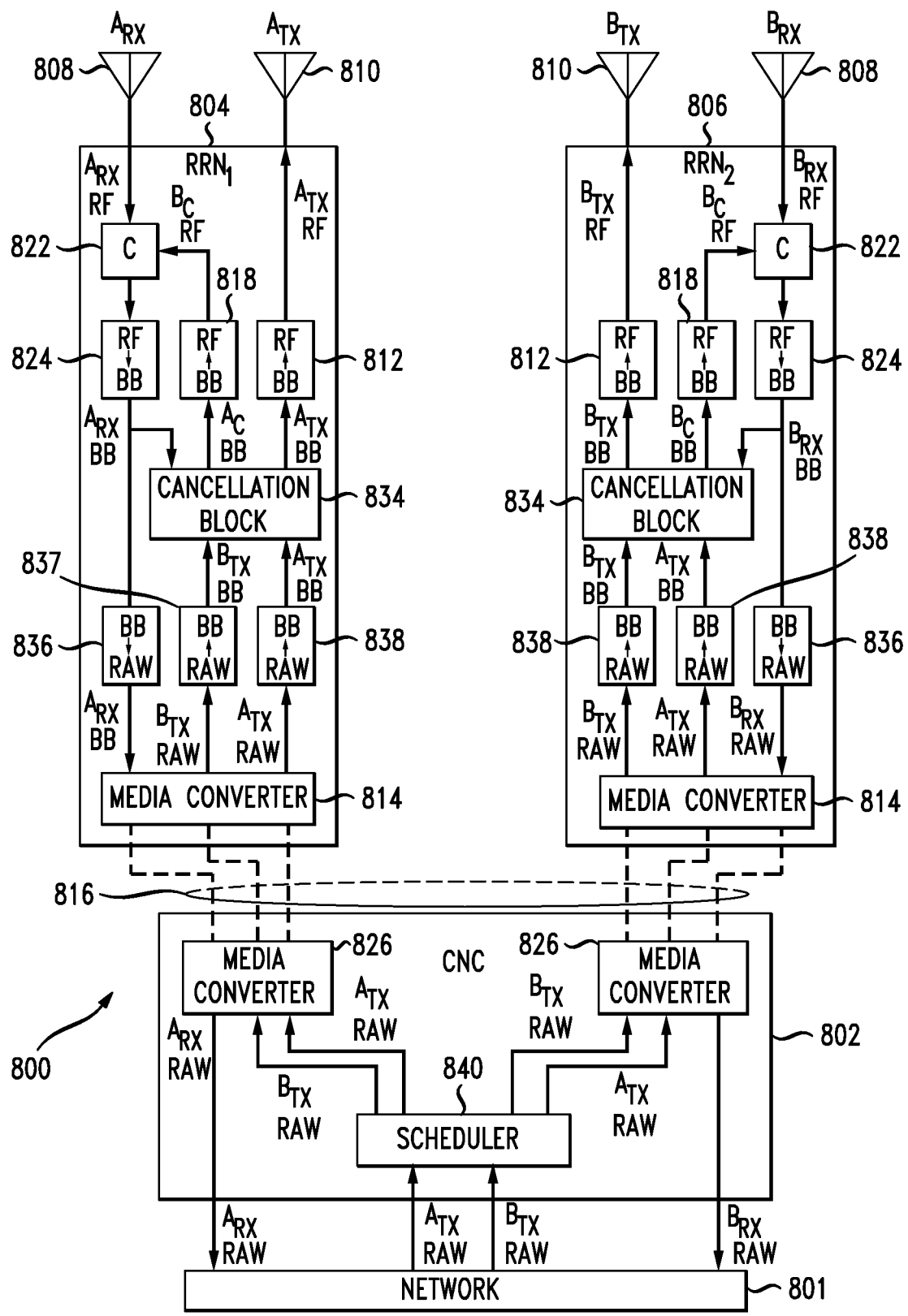
FIG. 8 illustrates a fourth hardware configuration.

FIG. 8 illustrates a fourth hardware configuration 800. FIG. 8 is similar to FIG. 7, however, where the configuration of FIG. 7 converts the received baseband signals to raw data 736 at the central computer 702 before forwarding the data to wider network, the system 800 of FIG. 8 converts the baseband received signals to raw data 836 at the remote radio nodes 804, 806. The raw data, $A_{RX\ RAW}$ or $B_{RX\ RAW}$, is then forwarded via media converters 814, 826 to the central computer 802, where the raw data can be forwarded to a larger network 801.

The central computer 802 receives raw transmit signals (i.e., $A_{TX\ RAW}$ and $B_{TX\ RAW}$), then schedules 840 transmissions and communication plans. The central computer 802 then forwards the raw data via media converters 826, 814. Alternatively, the raw transmission data can be sent directly to the remote radio nodes from a larger network 801 based on a schedule determined by the central computer scheduler 840. The remote radio nodes 804, 806 converts 837, 838 the raw transmit signals to baseband signals $A_{TX\ BB}$, $B_{TX\ BB}$, then inputs the baseband signals into the cancellation block 834.

The cancellation signal output by the cancellation block is upconverted 818 and the transmit signal is similarly upconverted 812. The upconverted transmit signal ($A_{TX\ RF}$) is then output by the transmit antenna 810. The receive antenna 808 receives desired signals $A_{RX\ RF}$, self-interference $A_{TX\ RF}$, and inter-cellsite interference $B_{TX\ RF}$. These signals are combined with the upconverted cancellation signal $A_{C\ RF}$, resulting in a "clean" signal $A_{RX}$ RF. The resulting "clean" signal $A_{RX\ RF}$ is downconverted 824 to a baseband signal, which in turn is input to the cancellation block 834 to provide feedback regarding inter-cellsite interference and self-interference. At the remote radio nodes 804, 806 the baseband signals $A_{RX\ BB}$ and $B_{RX\ BB}$ are converted 836 from baseband to raw data and forwards the raw data to the central computer 802 through media converters 814, 826 and cabling 816. The central computer 802 then forwards the raw data to a wider network 801.

Advantages of the fourth hardware configuration 800 include minimal delay between inter-cellsite estimation and cancellation due to the cancellation block 834 being located in the remote relay nodes 804, 806, as well as a lower frame rate used for downlink and uplink. In addition, common receive signal processing (performed at the CNC in the other hardware configurations) is removed in the fourth hardware configuration, providing an advantage of all the digital links between the CNC 802 and the remote nodes 804, 806 comprising information bits. Disadvantages include having multiple baseband converters 838A, 838B in the remote relay nodes 804, 806, as well as lack of capacity for network MIMO.

Table 1 illustrates the advantages and disadvantages of the four illustrated hardware configurations. The first configuration (FIG. 4, item 400), is referenced as design 1, or D1. Similarly, the second configuration (FIG. 6, item 600) is referenced as design 2, or D2; the third configuration (FIG. 7, item 700) is referenced as design 3, or D3; and the fourth configuration (FIG. 8, item 800) is referenced as design 4, or D4.

TABLE 1

| Design | RRN | Network MIMO | Bandwidth Downlink | Bandwidth Uplink |
|---|---|---|---|---|
| D1 | Simplest | Yes | 2H | 1H |
| D2 | Adj BBT | Yes | (2 + N)H | 1H |
| D3 | Adj BBT | Yes | (N + 1)L | 1H |
| D4 | Adj BBT + BBR | No | (N + 1)L | L |

Where H indicates a high bandwidth, such as an intermediate frequency bandwidth in Gbps.
L indicates a low bandwidth, such as an information bit rate, digitized I + Q, in Mbps.

Figure 9:
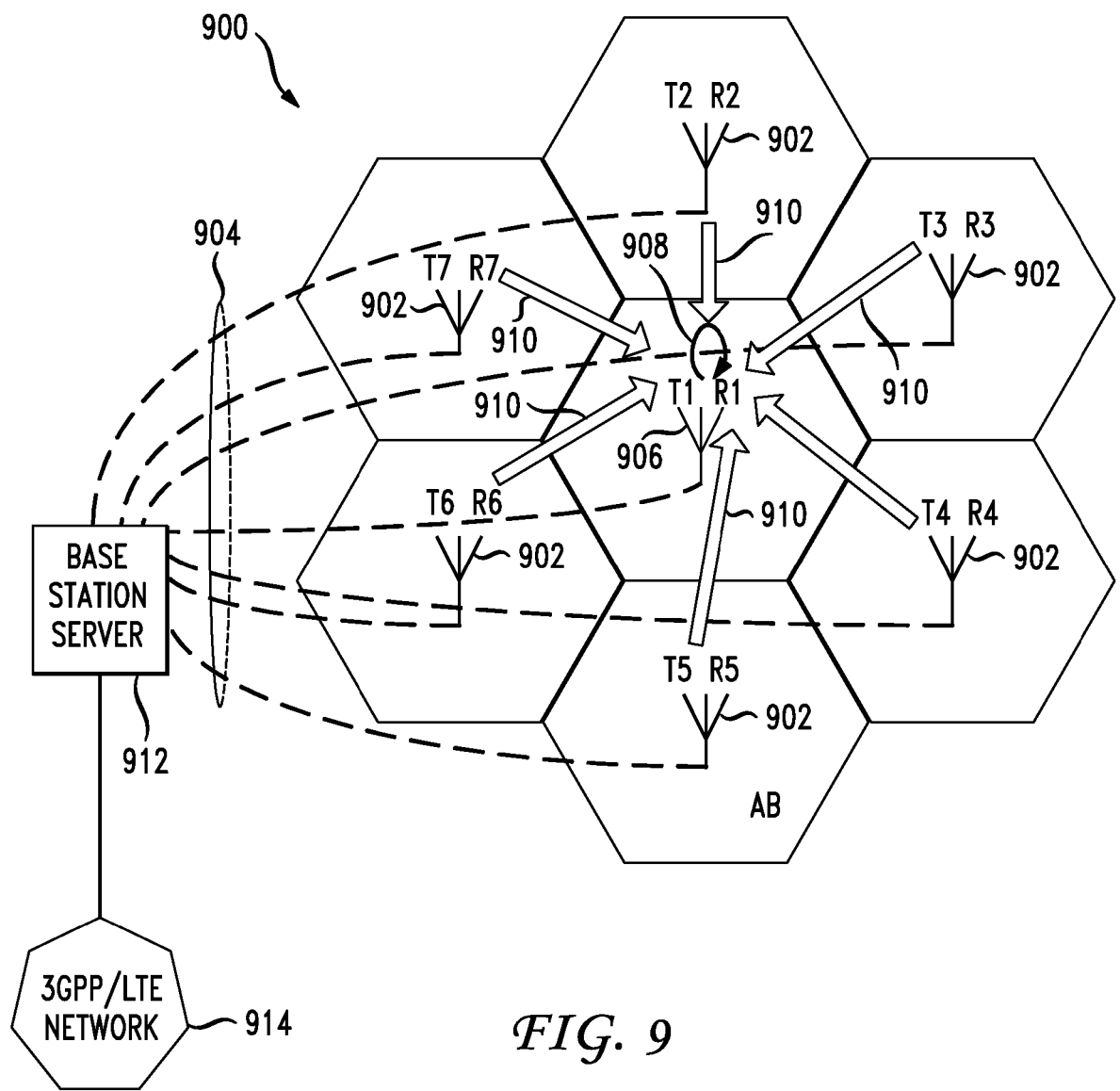
FIG. 9 illustrates multi-site inter-cellsite interference.

FIG. 9 illustrates multi-site inter-cellsite interference. Multiple nodes 902, 906, acting as base stations, are connected to a central computer (Base Station Server) 912 via fiber optic cabling 904. The central computer 912 in turn is connected to a larger, wider network, such as a 3GPP/LTE network 914. As the various access points 902, 906 communicate in full-duplex, the "central" node T1 906 experiences self-intererence 908 and inter-cellsite interference 910 from the six surrounding nodes 902. Previously described configurations and embodiments can be modified for circumstances such as the circumstance illustrated in FIG. 9, resulting in inter-cellsite cancellation signals which cancel interference from multiple nodes. The multiple inter-cellsite cancellation signals can be bundled together and added to the inter-cellsite interference simultaneously, or the multiple inter-cellsite cancellation signals can be applied separately and iteratively to the inter-cellsite cancellation until a sufficiently "clean" signal is retrieved.

Let c denote the number of cellsites within the interference zone, and $t_k$ be the number of transmitter antennas at cellsite k. The signal transmitted out of the j-th transmitter antenna of the i-th cellsite is denoted as $x_{ij}$; and the channel from the j-th transmitter antenna of the i-th cellsite to the q-th transmitter antenna of the p-th cellsite be $h_{pq}^{ij}$. Also let the ĥ be the estimation of a channel h. Thus the received over the air Inter-cellsite Interference signal at the n-th receiver antenna of the m-th cellsite is:

$$II_{mn} = \sum_{k=1}^{c}\sum_{l=1}^{t_k} x_{kl} h_{mn}^{kl}, \text{ where } k \neq m. \quad (1)$$

The self-interference signal at the same receiver antenna is:

$$SI_{mn} = \sum_{l=1}^{t_m} x_{ml} h_{mn}^{ml}, \text{ where } l \neq n; \quad (2)$$

And the overall over-the-air interference signal at the n-th receiver antenna of the m-the cellsite is:

$$I_{mn} = II_{mn} + SI_{mn}. \quad (3)$$

We denote the channel from the additional over-the-wire RF chain from the l-th transmitter antenna of the m-th cellsite to the n-th receiver antenna of the same cellsite as $hz_{mn}^{ml}$, the self-interference cancellation multiplier for cancelling the j-th transmitter antenna of the m-th cellsite at the n-th receiver antenna of the same cellsite is therefore:

$$K_{mn}^{ml} = -\frac{\hat{h}_{mn}^{ml}}{\widehat{hz}_{mn}^{ml}}, \text{ where } n \neq l. \quad (4)$$

The overall cancellation signal for self-interference at the same receiver antenna for cancelling all self-interference signals is:

$$CSI_{mn} = \sum_{l=1}^{t_m} x_{ml} K_{mn}^{ml} hz_{mn}^{ml}, \text{ where } l \neq n. \quad (5)$$

Similarly, the cancellation multiplier for cancelling inter-cellsite interference signal from the l-th transmitter antenna of the k-th cellsite at the n-th receiver antenna of the m-th cellsite is:

$$K_{mn}^{kl} = -\frac{\hat{h}_{mn}^{kl}}{\widehat{hz}_{mn}^{ml}}, \text{ where } m \neq k. \quad (6)$$

The overall cancellation signal for self-interference at the n-th receiver antenna of the m-th cellsite is:

$$CII_{mn} = \sum_{k=1}^{c}\sum_{l=1}^{t_k} x_{kl} K_{mn}^{kl} hz_{mn}^{kl}, \text{ where } k \neq m; \quad (7)$$

the overall signal that the n-th receiver antenna of the m-th cellsite receives is:

$$y_{mn} = SI_{mn} + CSI_{mn} + II_{mn} + CII_{mn} + xh, \quad (8)$$

where xh is the intended signal to be received. Ideally, if the channel estimations are perfect, $$\widehat{h_{ab}^{cd}} = h_{ab}^{cd} \text{ and } \widehat{hz_{ab}^{cd}} = hz_{ab}^{cd},$$

we can achieve $y_{mn} = xh$, all interference signals are cancelled. In reality, the channel estimation errors result in residual interferences and reduces signal to interference ratio.

Figure 10:
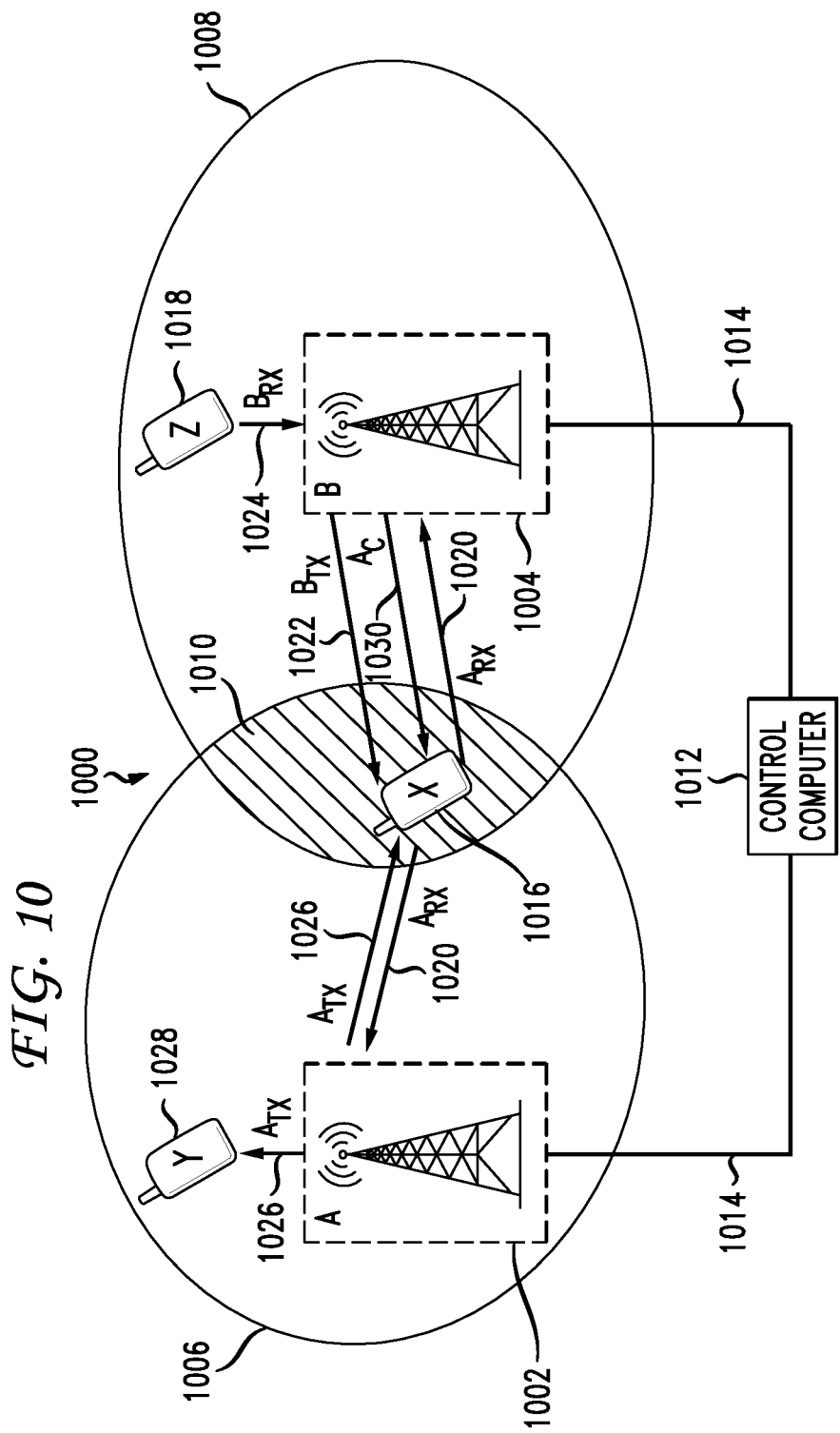
FIG. 10 illustrates a second embodiment reducing inter-cellsite interference.

FIG. 10 illustrates a second embodiment reducing inter-cellsite interference 1000. In particular, FIG. 10 illustrates inter-cellsite interference in full-duplex communications when access points 1002, 1004 are engaging in full-duplex communications some wireless nodes and half-duplex communications with other wireless nodes. For example, the access points 1002, 1004 are engaging in full-duplex communications by transmitting and receiving in a single frequency, however the transmission is directed to a different node than the node each tower is receiving data from. For example, tower A transmits $A_{TX}$ 1026 to node Y 1018 while receiving $A_{RX}$ 1020 from node X 1016. Tower B transmits $B_{TX}$ 1022 to node X 1016 while receiving $B_{RX}$ 1024 from node Z 1018.

Inter-cellsite interference can occur at node X 1016 because $A_{TX}$ 1026 is not only received by node Y 1028, but also node X 1016, because both nodes Y and X are in the range 1006 of tower A 1026. Similarly, because node X 1016 is in both the range 1006 of tower A and the range 1008 of tower B (a shared location 1010), communications from node X can be received at both towers. Not only does tower A 1002 receive $A_{TX}$ 1026, but so does tower B 1004, resulting in inter-cellsite interference at tower B 1004.

To counter-act the inter-cellsite interference at node X 1016, the central computer 1012 transmits a cancellation signal $A_C$ via cabling 1014 to tower B 1004. Tower B then communicates $A_C$ 1030 to node X 1016, allowing node X to cancel or attenuate the inter-cellsite interference caused by $A_{TX}$. The central computer 1012 can also communicate a cancellation signal to tower B which can be used to attenuate the inter-cellsite interference caused by $A_{RX}$ 1020 signal received. Alternatively, the $A_{RX}$ 1020 received at tower B can provide a multi-cell uplink reception capability, where the multiple versions of $A_{RX}$ 1020 are combined, providing an enhanced version of $A_{RX}$ 1020 to the wider network.

Figure 11:
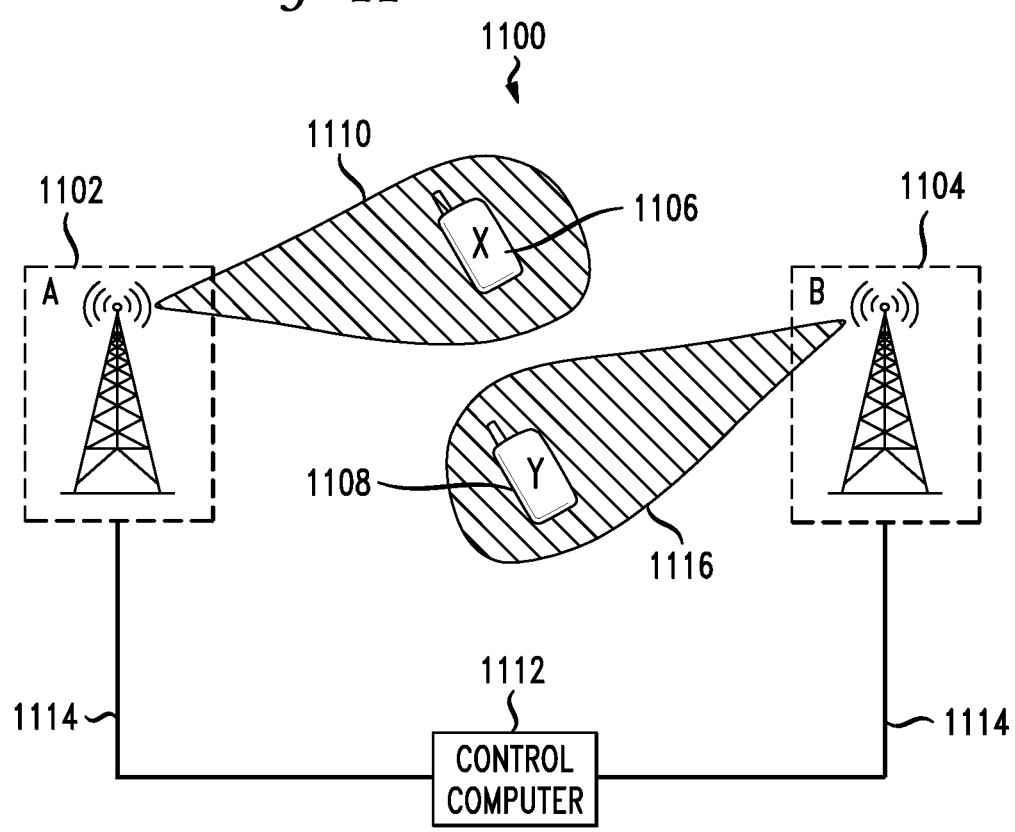
FIG. 11 illustrates reducing inter-cellsite interference by beam-forming.

FIG. 11 illustrates reducing inter-cellsite interference by beam-forming 1100. For example, instead of transmitting cancellation signals when inter-cellsite interference is occurring, the inter-cellsite interference can be avoided by directing signals in specific beam patterns, aka beam-forming. In the illustrated configuration 1100, various nodes including wireless devices 1106, 1108 and access points 1102, 1104 are communicating in full-duplex. The schedules for the various communications are determined by a central computer 1112 connected to the access points by cabling 1114. All of the nodes 1102, 1104, 1106, 1108 illustrated are configured with directional antenna capable of only transmitting in a desired direction. Based on the schedule determined by the central computer 1112, the directional antennas of both access points and wireless devices are redirected, creating directed signals paths 1110 and 1116 where full-duplex communications can occur without causing inter-cellsite interference in nodes not part of the full-duplex communication link.

Having disclosed some basic system components and concepts, the disclosure now turns to the exemplary method embodiment shown in FIG. 12. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 receives a channel amplitude and a phase estimate between a first station and a second station, wherein the first station and the second station create inter-cellsite interference on a channel (1202). The interference can be created during full-duplex communications associated with the first station and the second station. For example, the system 100 can schedule a first transmission from the first station and a second transmission from the second station for a common time period during the full-duplex communications. The first transmission and the second transmission can create the inter-cellsite interference. The stations can be stationary communication points, such as cellular towers, radio antennas, and wireless routers, or the stations can be wireless nodes such as cellphones, smartphones, laptops, tablets, or other 802.11/3G+ devices. Inter-cellsite interference can be occurring at the first station or second station, or can be at a separate node. For example, the inter-cellsite interference could be occurring at a wireless device scheduled to communicate with the first station, but which also receives communications from the second station, resulting in inter-cellsite interference at the wireless device. The channel used is a specific portion of the electromagnetic spectrum, and the inter-cellsite interference is caused by multiple communications being received at a single point associated with the first or second station. The communications can be multiple half-duplex communications signals, or can be multiple portions of full-duplex signals. As an example, if both the first station and the second station transmit to a wireless node, the wireless node will experience inter-cellsite interference on the channel. In such an instance, the system 100 can receive feedback from the wireless node regarding inter-cellsite interference via the channel amplitude and the phase estimate received.

The system 100 calculates, via a processor, a level of the inter-cellsite interference between the first station and the second station based on the channel amplitude and the phase estimate (1204). The system then, based on the level of inter-cellsite interference calculated, generates a cancellation signal based on the inter-cellsite interference. The cancellation signal has a power level and a phase which, when combined with the inter-cellsite interference, cancels or attenuates the inter-cellsite interference to a point where a desired communication on the channel can be interpreted. If there are multiple sources of inter-cellsite interference, the multiple cancellation signals can be applied iteratively until the desired signal reaches a threshold where it can be correctly interpreted. The threshold can be determined based on a number of bit errors in a sample portion of the communication. Cancellation of inter-cellsite interference can be combined or separated with cancellation of self-interference in full-duplex communications. That is, the cancellation signals for self-interference and inter-cellsite interference can be combined into a single cancellation signal, or can be separately applied to received interfering signals.

The system 100 then communicates the cancellation signal to the first station for transmission with additional data during full-duplex communications (1208). If the inter-cellsite interference is occurring at the first station, no transmission may be necessary. However, in instances where the inter-cellsite interference is occurring at a wireless node distinct from the first station and the second station, the first station transmits or communicates the cancellation signal to the wireless node. The transmission can be in parallel to other communications or can be combined with on-going communications. For example, if full-duplex communications are on-going between the first station and a wireless node where the inter-cellsite interference is occurring, the cancellation signal can be sent as part of the full-duplex communications or can be sent separately (i.e., on a separate channel).

Embodiments within the scope of the present disclosure may also include tangible and/or non-transitory computer-readable storage media or storage devices for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media. A computer-readable device encompasses any man-made storage media such as RAM, ROM, hard-drive, etc. and excludes the air interface or a signal per se.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply to radio, cellular, and wireless communications, and can be modified for full-duplex or half-duplex communications depending upon specific circumstances. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

We claim:

1. A method comprising:
   identifying, at a central controller, inter-cellsite interference on a channel, the inter-cellsite interference caused by a first full-duplex, simultaneous and bi-directional communication on the channel between a first mobile station and a first base station and by a second full-duplex, simultaneous and bi-directional communication between a second mobile station and a second base station communicating on the channel, wherein only the first mobile station is in a region of shared range of both the first base station and the second base station, and wherein the inter-cellsite interface impacts the first mobile station;
   receiving a channel amplitude and a phase estimate of the second full-duplex, simultaneous and bi-directional communication between the second mobile station and the second base station on the channel;
   calculating, via a processor at the central controller, a level of the inter-cellsite interference based on the channel amplitude and the phase estimate;
   generating, at the central controller, a cancellation signal based on the inter-cellsite interference; and
   communicating, via a non-transitory medium, the cancellation signal from the central controller to the first base station for transmission with additional data during additional full-duplex communication between the first base station and the first mobile station, wherein the cancellation signal, when applied to the inter-cellsite interference, attenuates the inter-cellsite interference to a threshold level.

2. The method of claim 1, wherein the channel takes up a defined amount of space on an electromagnetic spectrum.

3. The method of claim 1, wherein the inter-cellsite interference occurs at a wireless device.

4. The method of claim 1, wherein the non-transitory medium comprises at least one of a fiber optic cable and a copper cable.

5. The method of claim 1, wherein the first transmission and a second transmission create the inter-cellsite interference.

6. A system comprising:
   a processor; and
   a computer-readable storage medium having instruction stored which, when executed by the processor, cause the processor performing operations comprising:
   identifying inter-cellsite interference on a channel, the inter-cellsite interference caused by a first full-duplex, simultaneous and bi-directional communication on the channel between a first mobile station and a first base station and by a second full-duplex, simultaneous and bi-directional communication between a second mobile station and a second base station communicating on the channel, wherein only the first mobile station is in a region of shared range of both the first base station and the second base station, and wherein the inter-cellsite interface impacts the first mobile station;
   receiving a channel amplitude and a phase estimate of the second full-duplex, simultaneous and bi-directional communication between the second mobile station and the second base station on the channel;
   calculating a level of the inter-cellsite interference based on the channel amplitude and the phase estimate;
   generating a cancellation signal based on the inter-cellsite interference; and
   communicating the cancellation signal from the system to the first base station for transmission with additional data during additional full-duplex communication between the first base station and the first mobile station, wherein the cancellation signal, when applied to the inter-cellsite interference, attenuates the inter-cellsite interference to a threshold level.

7. The system of claim 6, wherein the channel takes up a defined amount of space on an electromagnetic spectrum.

8. The system of claim 6, wherein the inter-cellsite interference occurs at a wireless device.

9. The system of claim 6, wherein the non-transitory medium comprises at least one of a fiber optic cable and a copper cable.

10. The system of claim 6, wherein the first transmission and the second transmission create the inter-cellsite interference.

11. A computer-readable storage device having instruction stored which, when executed by a computing device, cause the computing device performing operations comprising:
   identifying inter-cellsite interference on a channel, the inter-cellsite interference caused by a first full-duplex, simultaneous and bi-directional communication on the channel between a first mobile station and a first base station and by a second full-duplex, simultaneous and bi-directional communication between a second mobile station and a second base station communicating on the channel, wherein only the first mobile station is in a region of shared range of both the first base station and the second base station, and wherein the inter-cellsite interface impacts the first mobile station;
   receiving a channel amplitude and a phase estimate of the second full-duplex, simultaneous and bi-directional communication between the second mobile station and the second base station on the channel;
   calculating a level of the inter-cellsite interference based on the channel amplitude and the phase estimate;
   generating a cancellation signal based on the inter-cellsite interference; and
   communicating the cancellation signal from the computing device to the first base station for transmission with additional data during additional full-duplex communication between the first base station and the first mobile station, wherein the cancellation signal, when applied to the inter-cellsite interference, attenuates the inter-cellsite interference to a threshold level.

12. The computer-readable storage device of claim 11, wherein the channel takes up a defined amount of space on an electromagnetic spectrum.

13. The computer-readable storage device of claim 11, wherein the inter-cellsite interference occurs at a wireless device.

14. The computer-readable storage device of claim 11, wherein the non-transitory medium comprises at least one of a fiber optic cable and a copper cable.

15. The computer-readable storage device of claim 11, wherein the cancellation signal, when applied to the inter-cellsite interference, attenuates the inter-cellsite interference to a threshold level for interpretation.

* * * * *